US009885329B2

(12) United States Patent
Vu

(10) Patent No.: US 9,885,329 B2
(45) Date of Patent: Feb. 6, 2018

(54) ROLLER TAPPET

(71) Applicant: Continental Automotive GmbH, Hannover (DE)

(72) Inventor: Ngoc-Tam Vu, Ludwigsburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 14/787,563

(22) PCT Filed: Sep. 10, 2014

(86) PCT No.: PCT/EP2014/069309
§ 371 (c)(1),
(2) Date: Oct. 28, 2015

(87) PCT Pub. No.: WO2015/036440
PCT Pub. Date: Mar. 19, 2015

(65) Prior Publication Data
US 2016/0186708 A1 Jun. 30, 2016

(30) Foreign Application Priority Data

Sep. 12, 2013 (DE) .................. 10 2013 218 260

(51) Int. Cl.
*F04B 1/04* (2006.01)
*F02M 59/10* (2006.01)
*F16H 53/06* (2006.01)

(52) U.S. Cl.
CPC ......... *F02M 59/102* (2013.01); *F04B 1/0426* (2013.01); *F04B 1/0439* (2013.01); *F16H 53/06* (2013.01)

(58) Field of Classification Search
CPC ................................ F04B 1/0439; F16H 53/06
See application file for complete search history.

(56) References Cited

U.S. PATENT DOCUMENTS

| 7,513,756 | B2 | 4/2009 | Aoki et al. | 417/470 |
|---|---|---|---|---|
| 2010/0037865 | A1 | 2/2010 | Fuchs | 123/508 |
| 2011/0073078 | A1 | 3/2011 | Vallon et al. | 123/495 |
| 2012/0294741 | A1* | 11/2012 | Nishimura | F02M 59/102 |
| | | | | 417/437 |

FOREIGN PATENT DOCUMENTS

| DE | 10157076 A1 | 5/2003 | F04B 1/04 |
|---|---|---|---|
| DE | 102004002487 A1 | 8/2005 | F01L 1/14 |

(Continued)

OTHER PUBLICATIONS

German Office Action, Application No. 102013218260.0, 4 pages, dated Jul. 24, 2014.

(Continued)

*Primary Examiner* — F. Daniel Lopez
(74) *Attorney, Agent, or Firm* — Slayden Grubert Beard PLLC

(57) ABSTRACT

A roller tappet includes a roller and a roller shoe in which the roller is rotatably mounted. The roller shoe has a first lateral surface with a recess for receiving the roller, a second lateral surface opposite the first lateral surface, and a third lateral surface between the first and second lateral surfaces. The third lateral surface and at least part of the second lateral surface are each curved.

16 Claims, 3 Drawing Sheets

(56) References Cited

FOREIGN PATENT DOCUMENTS

| DE | 102006045933 A1 | 4/2008 | ................ F04B 1/04 |
|----|-----------------|--------|------------|
| DE | 102008001871 A1 | 11/2009 | ............ F02M 59/06 |
| DE | 102009028394 A1 | 2/2011 | ............ F02M 59/10 |
| DE | 102009056304 A1 | 6/2011 | ................ F01L 1/14 |
| DE | 102011084486 A1 | 4/2013 | ............ F02M 59/10 |
| DE | 102012201302 A1 | 8/2013 | ............ F02M 59/10 |
| JP | 2004218459 A | 8/2004 | ............ F02M 59/10 |
| JP | 2009257451 A | 11/2009 | ............ F02M 59/10 |
| WO | 2015/036440 A1 | 3/2015 | ............ F02M 59/10 |

OTHER PUBLICATIONS

International Search Report and Written Opinion, Application No. PCT/EP2014/069309, 14 pages, dated Dec. 18, 2014.
Korean Office Action, Application No. 2017050755411, 9 pages, dated Jul. 20, 2017.
Chinese Office Action, Application No. 201480026860.0, 13 pages, dated Aug. 9, 2017.

\* cited by examiner

ROLLER TAPPET

CROSS-REFERENCE TO RELATED APPLICATIONS

This application is a U.S. National Stage Application of International Application No. PCT/EP2014/069309 filed Sep. 10, 2014, which designates the United States of America, and claims priority to DE Application No. 10 2013 218 260.0 filed Sep. 12, 2013, the contents of which are hereby incorporated by reference in their entirety.

TECHNICAL FIELD

The invention relates to a roller tappet which can be used in a high-pressure pump, for example, in order to move a pump piston of the high-pressure pump. The invention further relates to a high-pressure pump for a fuel injection system.

BACKGROUND

A roller tappet may be used as a component assembly of a high-pressure pump to transfer a force to a pump piston of a high-pressure pump. Due to the application of force, the pump piston moves and can reduce the volume of a pump working area of the high-pressure pump, for example. When fuel is fed to the pump working area via an inlet valve during a downwards movement of the pump piston, the pump piston compresses the fuel within the pump working area during the upwards movement due to the reduction in volume of the pump working area.

The roller tappet usually has a tappet which bears against the pump piston and transfers a force onto said pump piston. Furthermore, the roller tappet has a roller which is coupled with the tappet and, when the high-pressure pump is used in a fuel injection system, runs on a running surface of a cam of a drive shaft. The roller tappet enables the rotatory movement of the drive shaft to be converted into a translatory movement of the tappet and therefore of the pump piston, so that the pump piston is moved in an axial direction.

When a medium, for example a fuel, is compressed in the pump working area, a high force of up to a ton, for example, acts on the pump piston. The piston force is also transferred onto the roller tappet and therefore both to the tappet and also the roller. In order to avoid damage during pump operation, the roller should bear against the surface of the cam with its bearing surface in a full-faced manner. However, this is only fulfilled when the piston force transferred by the pump piston onto the roller tappet is evenly transferred to the roller tappet and therefore the tappet and the roller.

SUMMARY

One embodiment provides a roller tappet including a roller and a roller shoe in which the roller is rotatably mounted, wherein the roller shoe has a first side face with a recess for receiving the roller, wherein the roller shoe has a second side face opposite the first side face, wherein the roller shoe has a third side face which lies between the first and second side face, and wherein at least part of the second side face and the third side face each have a curved profile.

In a further embodiment, the at least part of the second side face and the third side face each exhibit a spherically shaped surface.

In a further embodiment, the at least part of the second side face is shaped as part of a spherical surface.

In a further embodiment, the third side face is shaped as part of a further spherical surface.

In a further embodiment, the roller tappet includes a tappet, wherein the tappet is formed as a hollow body with a hollow space, wherein the tappet exhibits a first opening in the hollow space on a first end face, wherein an inner wall of the tappet exhibits a shoulder projecting into the hollow space, and wherein the roller shoe is arranged in a region of the hollow space between the shoulder and the first opening of the hollow space.

In a further embodiment, the at least part of the second side face of the roller shoe bears against a surface of the shoulder.

In a further embodiment, the third side face of the roller shoe is arranged opposite the inner wall of the tappet.

In a further embodiment, the tappet exhibits a second opening in the hollow space on a second end face opposite the first end face, and a region of the hollow space between the second opening in the hollow space and the shoulder is configured to receive a pump piston.

In a further embodiment, a further part of the second side face of the roller shoe is designed to bear against a piston foot of the pump piston.

In a further embodiment, the further part of the second side face of the roller shoe exhibits a surface, the shape of which is different from the surface or part of the second side face of the roller shoe, and the further part of the second side face of the roller shoe exhibits a surface with a shape, in particular a planar surface shape, which is suitable for bearing against the piston foot of the pump piston in a full-faced manner.

In a further embodiment, the second side face of the roller shoe between the part and the other part exhibits a vent duct, the roller shoe exhibits at least one vent hole, and a first end of the at least one vent hole ends at the first side face of the roller shoe and wherein a second end of the at least one vent hole ends in the vent duct of the roller shoe.

Another embodiment provides a high-pressure pump for a fuel injection system comprising: a roller tappet as described above, and a pump piston with a piston foot, wherein the pump piston is arranged in the region of the hollow space of the roller tappet between the second opening of the hollow space in the tappet and the shoulder of the tappet, and wherein the further part of the second side face of the roller shoe bears against the piston foot of the pump piston.

BRIEF DESCRIPTION OF THE DRAWINGS

Example embodiments of the invention are explained in greater detail below reference to the figures, in which.

DETAILED DESCRIPTION

Figure 1:
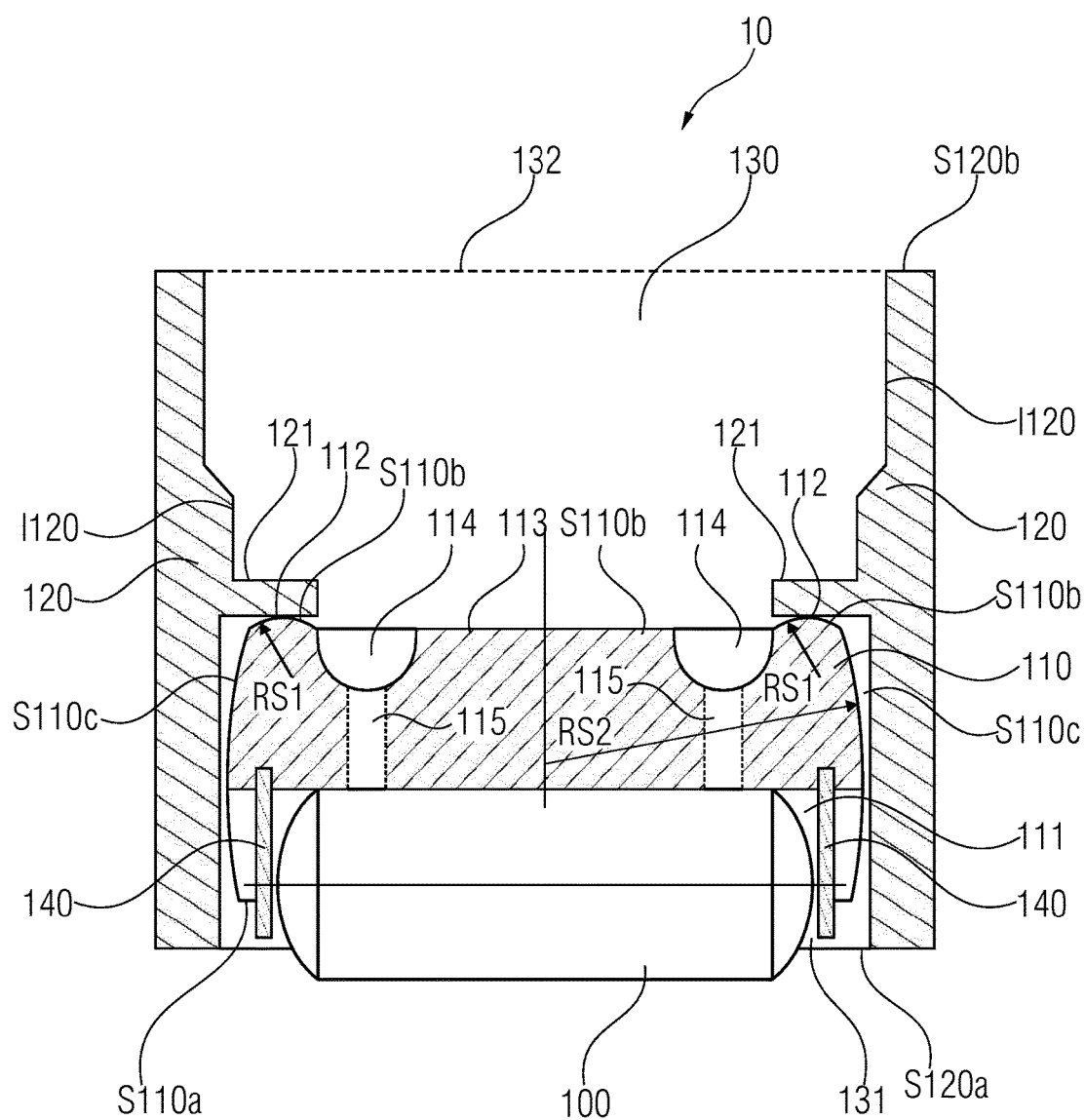
FIG. 1 shows an embodiment of a roller tappet with a uniform force distribution onto a roller of the roller tappet.

Embodiments of the invention provide a roller tappet in which a force acting on a tappet of the roller tappet is uniformly transferred onto a roller of the roller tappet, and a high-pressure pump for a fuel injection system in which a force from the pump piston acting on the tappet of a roller tappet is evenly distributed on the roller of the roller tappet.

Some embodiments provide a roller tappet including a roller and a roller shoe in which the roller is rotatably mounted. The roller shoe has a first side face with a recess for receiving the roller.

Furthermore, the roller shoe has a second side face opposite the first side face. Moreover, the roller shoe has a third side face which lies between the first and second side face. At least part of the second side face and the third side face each have a curved profile.

According to one embodiment, the at least part of the second side face of the roller shoe and the third side face of the roller shoe each exhibit a spherically shaped surface. In particular, the at least one part of the second side face may be shaped as part of a spherical surface. The third side face may be shaped as part of a further spherical surface, for example. The roller shoe may, for example, exhibit an outer shape which is left over from a sphere if a partial segment is cut from the sphere or two partial segments are cut off along a parallel cutting line. For example, the roller shoe of the roller tappet may exhibit an outer shape which remains of a sphere in which the two sphere caps are cut off.

The spherical shape of the roller shoe enables the roller shoe to be set in all directions during application of a force. Due to the spherical contours of the roller shoe, the roller shoe or the roller tappet therefore offers a balancing possibility against misalignment of a drive shaft, which may occur as a result of manufacturing defects, for example, as well as a balancing possibility in respect of deformation of the shaft, for example deflection of the shaft as a result of the high piston force. The special shaping of the roller shoe means that a flow of forces between the pump piston, roller shoe, roller and drive shaft can be guaranteed. A further advantage is that the tappet guide is designed with a small cross section and the tappet can therefore be guided very closely.

Some embodiments provide a high-pressure pump for a fuel injection system, in which a force transferred from the pump piston to the roller tappet is evenly distributed onto the roller of the roller tappet. According to one embodiment, the high-pressure pump for a fuel injection system comprises a roller tappet according to the embodiment described above and also a pump piston with a piston foot. The pump piston is arranged in a region of a hollow space of the roller tappet between an opening of the hollow space and a shoulder of the tappet arranged inside the hollow space and projecting from the inner wall of the tappet into the hollow space. A further part of the second side face of the roller shoe, which preferably exhibits not a spherical contour, but a planar surface, for example, bears against the piston foot of the pump piston, thereby allowing a uniform distribution of force between the pump piston and roller shoe.

As explained above, fault-free operation or the avoidance of damage to a high-pressure pump during operation requires that a force transferred from the pump piston to the tappet of a roller tappet of the pump is distributed uniformly onto the roller of the roller tappet, so that the roller bears in a full-faced manner against a cam track of a cam of a drive shaft. In the case of a high-pressure pump, however, there is a danger that the force from the pump piston will not be evenly distributed onto the roller of the roller tappet.

The pump housing of the high-pressure pump commonly exhibits a bore for guiding the tappet. Due to production errors, the tappet bore may be misaligned. As a consequence of this misalignment, the tappet also exhibits a skewed position in the tappet guide and the roller shoe or the roller arranged thereon therefore also exhibits a skewed position in respect of a bearing surface of a cam of a drive shaft.

Apart from production errors affecting the pump, for example the tappet bore, production errors affecting the drive shaft may also lead to the axis of the drive shaft being misaligned in respect of the bearing line of the roller on the cam of the drive shaft. A further source of defect which may mean that the roller does not bear against the bearing surface of the cam of the drive shaft in a full-faced manner arises due to the fact that the force of the pump piston exerted on the drive shaft via the roller tappet during pump operation can cause deflection of the drive shaft. The bending of the drive shaft means that the roller no longer bears against the cam track of the cam of the drive shaft in a full-faced manner.

FIG. 1 shows an embodiment of a roller tappet 10 which can be used to drive a pump piston of a high-pressure pump of a fuel injection system and in which the force exerted by the pump piston on the roller tappet is evenly distributed over the roller, so that the roller bears against the bearing surface of the cam of a drive shaft in a largely full-faced manner.

The roller tappet 10 comprises a roller 100 and a roller shoe 110 in which the roller 100 is rotatably mounted. The roller shoe 110 has a first side face S110$a$ with a recess 111 for receiving the roller 100. The roller 100 may be held in the recess 111 of the roller shoe 110 by means of a securing ring 140. The roller shoe 110 furthermore exhibits a second side face S110$b$ lying opposite the first side face S110$a$. Moreover, the roller shoe 110 exhibits a third side face S110$c$ between the first side face S110$a$ and the second side face S110$b$. At least part 112 of the second side face S110$b$ and the third side face S110$c$ each have a curved profile.

According to a possible embodiment, the at least part 112 of the second side face S110$b$ and the third side face S110$c$ may each exhibit a spherically shaped surface or contour. The at least part 112 of the second side surface S110$b$ may, for example, be shaped as part of a spherical surface. In the exemplary embodiment in FIG. 1, part 112 of the second side surface S110$b$ exhibits a spherically shaped surface with a sphere radius RS1. The third side surface S110$c$ may be shaped as part of a further spherical surface. In the exemplary embodiment in FIG. 1, the third side surface S110$c$ has a spherically shaped surface with a sphere radius RS2. The part 112 of the second side surface S110$b$ may be shaped as part of a spherical surface which has a smaller radius than the other sphere, the surface contour of which exhibits the third side face S110$c$. The roller shoe may, for example, exhibit on its third side face S110$c$ a spherical contour which remains of a sphere when a partial segment is cut away from the sphere or two partial segments are cut off along a parallel cutting line. For example, the roller shoe of the roller tappet may exhibit an outer shape which remains of a sphere in which the two spherical caps are cut off.

The roller tappet shown in FIG. 1 comprises a tappet 120 which may be formed as a hollow body with a hollow space 130. The tappet exhibits a first end side S120$a$ with a first opening 131 in the hollow space 130. An inner wall I120 of the tappet, which is arranged inside the hollow space 130, exhibits a shoulder 121 projecting into the hollow space 130. The roller shoe 110 is arranged in a region of the hollow space 130 between the shoulder 121 and the first opening 131 of the hollow space. The at least part 112 of the second side face S110$b$ of the roller shoe 110 bears against a surface of the shoulder 121. The third side face S110$c$ of the roller shoe 110 is arranged opposite the inner wall I120 of the tappet 120.

According to a further embodiment of the roller tappet 10, the tappet 120 exhibits a second opening 132 in the hollow space 130 on a second end face S120b opposite the first end face S120a. A region of the hollow space 130 between the second opening 132 in the hollow space and the shoulder 121 is configured to receive a pump piston 20.

Figure 2:
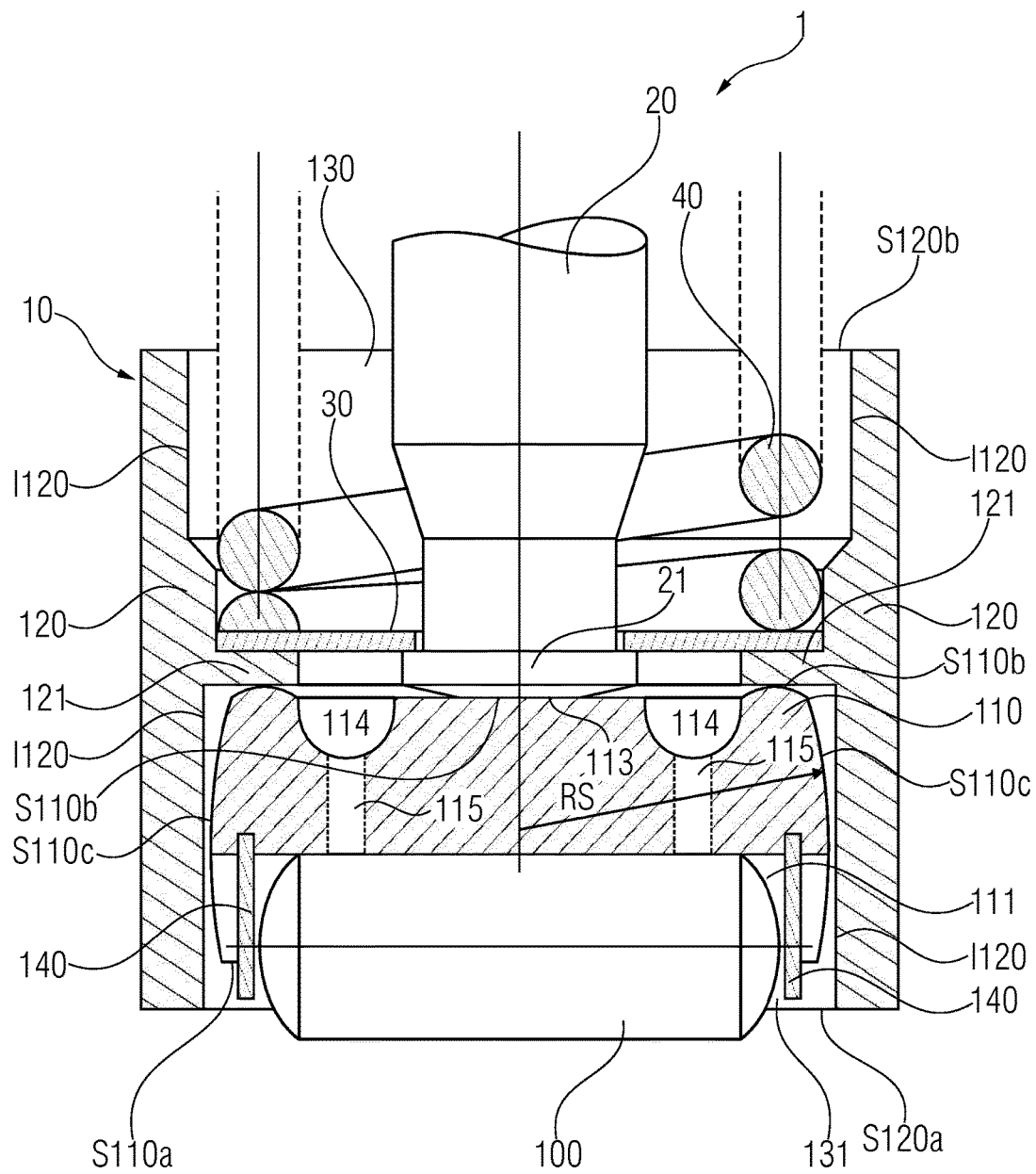
FIG. 2 shows an embodiment of a high-pressure pump for a fuel injection system with a roller tappet.

Further embodiments of the roller tappet are explained with the help of FIG. 2, which shows a high-pressure pump 1 in which the roller tappet 10 is arranged to drive a movement of the pump piston 20.

According to a further possible embodiment of the roller tappet 10, the second side face S110b exhibits a further part 113 different from the partial region 112. The further part 113 of the second side face S110b of the roller shoe is designed to bear against a piston foot 21 of the pump piston 20. The further part 113 of the second side face S110b of the roller shoe may exhibit a surface, the shape of which is different from the spherical contour of the partial region 112 of the second side face S110b of the roller shoe. The further part 113 of the second side face S110b of the roller shoe may, in particular, exhibit a surface with a shape which is suitable to bear against the piston foot 21 of the pump piston 20 in a full-faced manner. The further partial region 113 of the second side face S110b of the roller shoe may, for example, exhibit a planar surface shape, unlike the spherically shaped surface of the partial region 112.

According to a further embodiment of the roller tappet, the second side face S110b of the roller shoe 110 between the partial region 112 and the further partial region 113 may exhibit a vent duct 114. The roller shoe 110 may exhibit at least one vent hole 115. A first end of the at least one vent hole 115 ends at the first side face S110a of the roller shoe. A second end of the at least one vent hole 115 ends in the vent duct 114 of the roller shoe.

In the embodiment of the high-pressure pump 1 for a fuel injection system shown in FIG. 2, the pump piston 20 is arranged in the region of the hollow space 130 of the roller tappet between the second opening 132 of the hollow space 130 of the tappet and the shoulder 121 of the tappet. The other part 113 of the second side face S110b of the roller shoe bears against the piston foot 21 of the pump piston 20. The shoulder 121 of the tappet rotating in the hollow space of the tappet in the circumferential direction forms a bearing for a return plate 30. The perpendicular distance between the surface of the further partial region 113 of the second side face S110b of the roller shoe and the bearing surface of the shoulder 121 for the return plate 30 substantially corresponds to the height of the piston foot 21.

The return plate 30 exhibits a central opening with a diameter which is smaller than the diameter of the piston foot 21.

The pump piston 20 passes through the central opening in the return plate 30, so that during an axial movement of the pump piston in the direction of the end face S120b of the tappet, the pump piston 20 takes the return plate 30 with it. A piston spring 40 is supported by the return plate 30. During an axial movement of the pump piston in the direction of the second end face S120b of the tappet, the piston spring is compressed by the return plate 30 moving along with it. The vent duct 114 prevents air caught during a relative movement between the other partial region 113 of the second side face S110b and the return plate 30 in the longitudinal direction of the roller tappet between the return plate 30 and the second side face S110b of the roller shoe from being compressed there.

The high-pressure pump 1 shown in FIG. 2 may be part of a fuel injection system, for example part of a common-rail fuel injection system. In a fuel injection system of this kind, fuel is supplied by means of a delivery pump from a tank on an inlet side of the high pressure pump 20. The high-pressure pump is connected to a pressure accumulator via a fuel outlet channel. The pressure accumulator is attached to injectors for injecting fuel into the cylinders of an engine.

In order to compress the fuel fed to the high-pressure pump via the inlet side thereof, the pump piston 20 is moved upwards in an axial direction, as a result of which the fuel admitted into the pump working area is compressed. The high-pressure volume of compressed fuel produced by the high-pressure pump is then conveyed via an outlet valve and the fuel discharge channel into the pressure accumulator.

In order to drive the pump piston, the roller tappet can be used in the high-pressure pump. The roller of the roller tappet runs on a bearing face of a cam of a drive shaft. The design of the roller shoe, in particular the spherical shape of the partial region 112 of the second side face S110b of the roller shoe and the spherical contour of the third side face S110c, makes it possible for the roller shoe to be set in all directions when force is applied by the pump piston when the fuel is compressed. In this way, the force transferred from the pump piston to the roller tappet can be evenly distributed onto the roller, so that the roller can bear against the cam track of the cam of the drive shaft in a largely full-faced manner.

Figure 3:
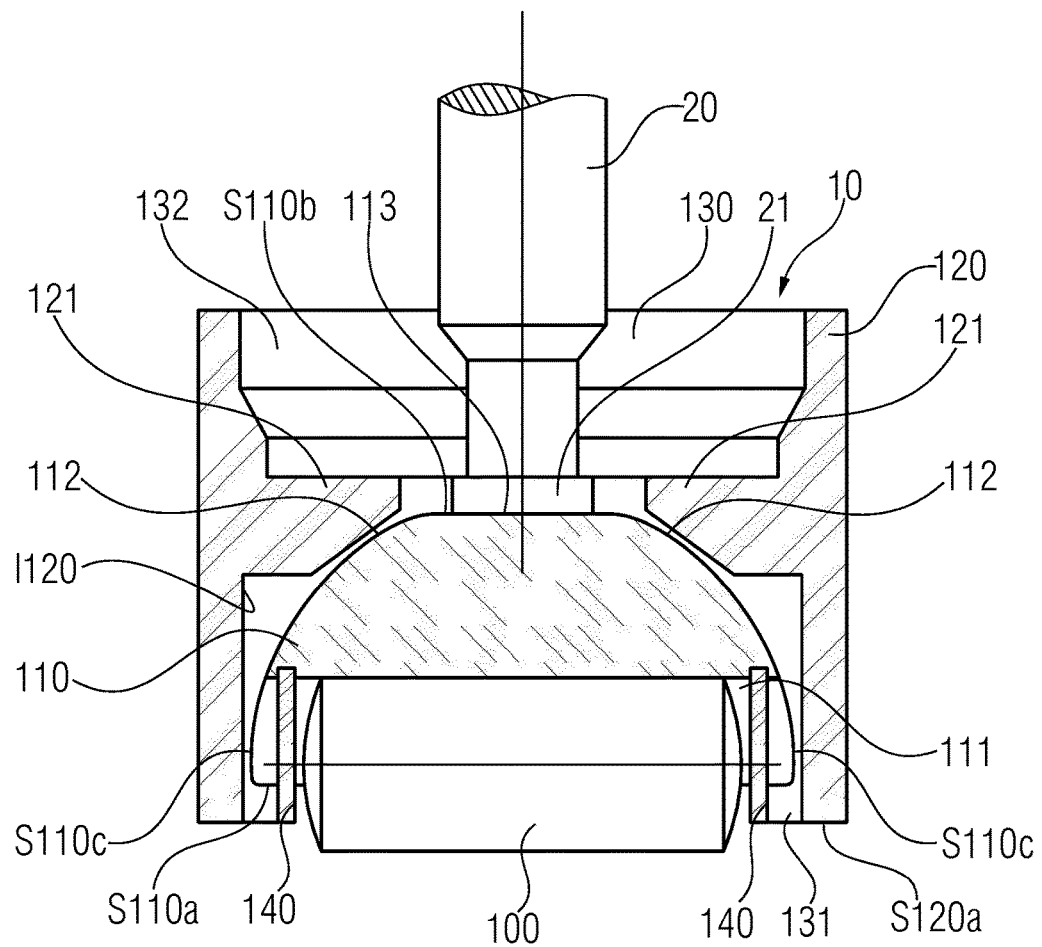
FIG. 3 shows a further embodiment of a roller tappet of a high-pressure pump.

FIG. 3 shows a further possible embodiment of the roller shoe 110 in which the roller 100 is rotatably mounted.

In this exemplary embodiment, the roller shoe 110 exhibits an outer shape which remains of a sphere when a first partial segment and a second partial segment with a parallel cutting line have been cut off the sphere. The roller shoe 110 therefore has a shape corresponding to a sphere in which a smaller sphere cap and a larger sphere cap opposite the smaller sphere cap have been cut off.

This produces a spherically shaped surface on the third side face S110c which changes in a stepless manner into the second side face S110b. In this case, the second side face S110b likewise exhibits a spherically shaped surface in the partial regions 112, in which the second side face S110b is in contact with the shoulder 121. By contrast, the partial region 113 of the second side face S110b, which is in contact with the piston 20, exhibits a planar surface.

The spherical embodiments shown both in FIG. 1 and also in FIG. 3 on the second side face S110b and the third side face S110c allow punctiform contact with the walls of the tappet 120, as a result of which during the application of transverse forces, the roller shoe 110 can be set in the tappet 120 and balance out these transverse forces. In some cases, the second side face S110b and/or the third side face S110c may be in contact with the walls of the tappet 120 along a circle, depending on the orientation of the force and/or the relative size of the hollow space in tappet 120 and the side faces S110b,c.

Not depicted in FIG. 3 is a preferred anti-rotation device which prevents unwanted rotation of the roller shoe 110 about an axis arranged parallel to the longitudinal extension of the pump piston 20.

LIST OF REFERENCE NUMBERS

1 High-pressure pump
10 Roller tappet
20 Pump piston
21 Piston foot
30 Return plate
40 Spring 100 Roller
110 Roller shoe
120 Tappet
121 Shoulder
130 Hollow space
140 Locking ring

What is claimed is:

1. A cam follower comprising:
a roller, and
a roller shoe in which the roller is rotatably mounted, wherein the roller shoe comprises:
a bottom face having a recess for receiving the roller,
a top face opposite the bottom face, and
a side face located between the top face and the bottom face, wherein a part of the top face has a curved profile, and a part of the side face has a curved profile,
a tappet defining a hollow space for receiving the roller shoe,
wherein an inner wall of the tappet has a shoulder projecting into the hollow space,
the roller shoe is arranged in the hollow space adjacent the shoulder with at least one of the curved profiles in point contact with a wall of the hollow space.

2. The cam follower of claim 1, wherein the part of the top face and the part of the side face each comprise a spherically shaped surface.

3. The cam follower of claim 1, wherein the part of the top face defines part of a spherical surface.

4. The cam follower of claim 3, wherein the side face defines part of a further spherical surface.

5. The cam follower of claim 1, wherein the part of the top face of the roller shoe bears against a surface of the shoulder.

6. The cam follower of claim 1, wherein the side face of the roller shoe is arranged opposite the inner wall of the tappet.

7. The cam follower of claim 1, wherein the tappet has a first opening and a second opening in the hollow space on end faces opposite one another, wherein the roller shoe is disposed in a first region of the hollow space between the first opening and the shoulder and a second region between the second opening and the shoulder is configured to receive a pump piston.

8. The cam follower of claim 7, wherein a further part of the top face of the roller shoe is configured to bear against a piston foot of the pump piston.

9. The cam follower of claim 8,
wherein the further part of the top face of the roller shoe has a surface having a shape that is different from the surface of the part of the top face of the roller shoe,
wherein the further part of the top face of the roller shoe has a surface having a planar surface shape configured to bear against the piston foot of the pump piston in a full-faced manner.

10. The cam follower of claim 8,
wherein the top face of the roller shoe between the part and the further part includes a vent duct,
wherein the roller shoe includes a vent hole,
wherein a first end of the vent hole ends at the bottom face of the roller shoe, and
wherein a second end of the vent hole ends in the vent duct of the roller shoe.

11. A high-pressure pump for a fuel injection system, the high-pressure pump comprising:
a cam follower comprising:
a roller, and
a roller shoe in which the roller is rotatably mounted, wherein the roller shoe comprises:
a bottom face having a recess for receiving the roller,
a top face opposite the first side face, and
a side face located between the top face and the bottom face, wherein at least part of the top face has a curved profile, and at least a part of the side face has a curved profile,
a tappet defining a hollow space for receiving the roller shoe,
wherein an inner wall of the tappet has a shoulder projecting into the hollow space, and
the roller shoe is arranged in the hollow space adjacent the shoulder and with at least one of the curved profiles in point contact with a wall of the hollow space, and
a pump piston having a piston foot,
wherein the pump piston is arranged in the region of the hollow space of the cam follower between a second opening of the hollow space in the tappet and the shoulder of the tappet, and
wherein the further part of the second side face of the roller shoe bears against the piston foot of the pump piston.

12. The high-pressure pump of claim 11, wherein each of the part of the top face and the part of the side face of the cam follower has a spherically shaped surface.

13. The high-pressure pump of claim 11, wherein the part of the top face of the cam follower defines part of a spherical surface.

14. The high-pressure pump of claim 13, wherein the side face of the cam follower defines part of a further spherical surface.

15. The high-pressure pump of claim 11, wherein the part of the top face of the roller shoe bears against a surface of the shoulder.

16. The high-pressure pump of claim 11, wherein the side face of the roller shoe is arranged opposite the inner wall of the tappet.

* * * * *